(12) United States Patent
Kanai et al.

(10) Patent No.: US 7,622,209 B2
(45) Date of Patent: Nov. 24, 2009

(54) FUEL CELL SYSTEM AND FUEL CELL STARTING METHOD

(75) Inventors: Tsuyoshi Kanai, Tokyo (JP); Go Sudo, Kanagawa (JP)

(73) Assignee: Sony Corporation, Tokyo (JP)

( * ) Notice: Subject to any disclaimer, the term of this patent is extended or adjusted under 35 U.S.C. 154(b) by 387 days.

(21) Appl. No.: 11/570,964

(22) PCT Filed: Jun. 15, 2005

(86) PCT No.: PCT/JP2005/010922

§ 371 (c)(1),
(2), (4) Date: Dec. 19, 2006

(87) PCT Pub. No.: WO2005/124914

PCT Pub. Date: Dec. 29, 2005

(65) Prior Publication Data

US 2007/0212581 A1     Sep. 13, 2007

(30) Foreign Application Priority Data

Jun. 21, 2004     (JP)     ............................. 2004-182546

(51) Int. Cl.
*H01M 8/04* (2006.01)
*H01M 8/00* (2006.01)

(52) U.S. Cl. .......................................... 429/24; 429/13
(58) Field of Classification Search ............ 429/24, 429/34, 13
See application file for complete search history.

(56) References Cited

U.S. PATENT DOCUMENTS 6,743,538 B2     6/2004     Christen et al.

2002/0025465 A1     2/2002     Christen et al.

FOREIGN PATENT DOCUMENTS

| JP | 51-4715 | 1/1976 |
|---|---|---|
| JP | 5-307970 | 11/1993 |
| JP | 2002-75414 | 3/2002 |
| JP | 2003-132924 | 5/2003 |
| JP | 2003-520399 | 7/2003 |
| JP | 2003-297401 | 10/2003 |
| JP | 2003-331885 | 11/2003 |
| JP | 2004-055474 | 2/2004 |
| WO | 0152339 | 7/2001 |

*Primary Examiner*—Patrick Ryan
*Assistant Examiner*—Thomas H. Parsons
(74) *Attorney, Agent, or Firm*—K&L Gates, LLP

(57) ABSTRACT

The present invention provides a system in which a fuel cell can be operated using a fuel having a constantly optimum concentration and the time taken to start the fuel cell is shortened. A low-concentration fuel for performing a power generation reaction and a high-concentration fuel for performing the power generation reaction and a reaction for raising the temperature of a power generation cell are stored respectively in separate storage vessels. The fuel supplied to a negative electrode can be instantaneously changed over according to the temperature of the power generation cell. This makes it possible to perform an operation at a constantly optimum fuel concentration. By having the capability to raise the power generation cell temperature in a short time, it is possible to reduce the capacity of an auxiliary battery used when power generation cell temperature is low, and to reduce the fuel cell system in size.

8 Claims, 3 Drawing Sheets

FUEL CELL SYSTEM AND FUEL CELL STARTING METHOD

CROSS REFERENCE TO RELATED APPLICATIONS

The present application claims priority to Japanese Patent Document No. P2004-182546 filed on Jun. 21, 2004, the disclosure of which is herein incorporated by reference.

BACKGROUND

The present invention relates to a fuel cell system, and to a method of starting the fuel cell system.

A fuel cell is a power generation element for generating electric power by an electrochemical reaction between a fuel gas, such as hydrogen or methanol, and an oxidizer gas such as oxygen. The fuel cell, in which the reaction products generated at the time of power generation is water, has been attracting attention as a power generation element not causing environmental pollution, and the use of the fuel cell, for example, as a driving power source for driving an automobile has been tried.

Fuel cells are classified into various types by the kind of electrolyte or the like, and a representative type which has been known is a fuel cell using a solid polymer electrolyte as the electrolyte. The solid polymer electrolyte type fuel cell is promising as a driving power source for electronic apparatuses, since it can be reduced in cost, it can be easily reduced in size, thickness and weight, and, from the viewpoint of cell performance, it has a high output density. The solid polymer electrolyte type fuel cell usually uses hydrogen as the fuel, and, in addition, there have been developed those in which hydrogen to be used as the fuel is produced by modifying methanol or natural gas. In recent years, further, a direct methanol type fuel cell has been developed in which methanol is supplied directly to the fuel cell as a fuel, thereby generating electric power.

The direct methanol type fuel cell is operated at an appropriate operating temperature of 60 to 80° C. Therefore, it is necessary to raise the temperature of the fuel cell in starting the fuel cell from its stopped state, so that the fuel cell cannot be started instantaneously. For solving this problem, there is a method in which driving is conducted by use of an auxiliary battery such as a lithium ion battery until the starting of the fuel cell. In the case where the time until the starting is long, however, an auxiliary battery having an electric capacity suited to the long-time operation is needed. In addition, there is also a method in which heating by a heater or the like is used, but this method also requires electric power of an auxiliary battery.

Besides, there is a fuel cell system in which, at the time of starting, the concentration of an aqueous methanol solution as a fuel is raised, and the aqueous methanol solution permeated through an electrolyte film is brought directly into combustion with oxygen at a cathode (refer to, for example, Japanese Patent Laid-open No. 2003-520399). In addition, there is a method in which methanol (refer to, for example, Japanese Patent Laid-open No. Hei 5-307970) or an aqueous methanol solution (refer to, for example, Japanese Patent Laid-open No. 2002-075414) is supplied directly to a cathode, to be brought directly into combustion with oxygen.

However, in the fuel cell system described in Japanese Patent Laid-open No. 2003-520399, methanol fed from a single methanol tank provided in the system is sprayed in a circulating passage connected to an anode by use of a spray nozzle, and the spray amount is controlled according to the temperature of the power generation cell. Specifically, the concentration of an aqueous methanol solution supplied to the anode is controlled by the amount of methanol sprayed by the spray nozzle. In this system, however, the concentration of the aqueous methanol solution supplied to the anode cannot be lowered unless the methanol in the aqueous methanol solution is consumed in the power generation cell. Therefore, when the temperature of the power generation cell is raised, the switching from a high-concentration aqueous methanol solution to a low-concentration aqueous methanol solution cannot be instantaneously achieved even if the spraying of methanol from the spray nozzle is stopped. Furthermore, this system has the problem that an operation at an optimum concentration cannot always be realized. In the method described in Japanese Patent Laid-open No. Hei 5-307970, most of the reaction between methanol fed directly to the cathode and oxygen is concentrated in the vicinity of a methanol inlet port, and heat is locally generated at that portion, so that the temperature of the power generation cell as a whole becomes nonuniform. Therefore, even when the temperature of the power generation cell is raised above a predetermined temperature, an efficient reaction cannot be achieved because the temperature of the power generation cell as a whole is not uniform. Besides, the method described in Japanese Patent Laid-open No. 2002-075414 has the problem that water in the aqueous methanol solution fed to the cathode would adhere to the cathode. Since the power generation reaction takes place at the interface between electrode and electrolyte, the adhesion of water to the cathode reduces the amount of oxygen making contact with the cathode, thereby lowering the efficiency of the power generation reaction.

SUMMARY

In consideration of the circumstances of the related art, it is an object of the present invention to provide a system in which a fuel cell can be operated by use of a fuel having a constantly optimum concentration, and a system in which a fuel is not supplied directly to a cathode. It is another object of the present invention to shorten the time taken in starting a fuel cell.

According to the present invention, there is provided a fuel cell system including a power generation cell having an electrolyte sandwiched between a positive electrode and a negative electrode, a first storage vessel for storing a low-concentration fuel having a predetermined concentration, and a second storage vessel for containing a high-concentration fuel higher in concentration than the low-concentration fuel, the fuels differing in concentration and stored in the first storage vessel and the second storage vessel are switchedly supplied according to the temperature of the power generation cell.

According to the fuel cell system in the present invention, the low-concentration fuel for performing mainly a power generation reaction and the high-concentration fuel for performing mainly the power generation reaction and a reaction for raising the temperature of the power generation cell are stored respectively in separate storage vessels, whereby the fuel supplied to the negative electrode can be instantaneously switched according to the temperature of the power generation cell. This makes it possible to perform an operation at a constantly optimum concentration. In addition, by supplying the high-concentration fuel from the negative electrode to the positive electrode through the electrolyte, the high-concentration can be supplied dispersedly, whereby local heat generation can be prevented. Besides, it is possible to prevent adhesion of water to the positive electrode which might be generated when the fuel is supplied directly to the positive electrode.

In addition, according to the present invention, there is provided a method of starting a fuel cell system which includes a power generation cell having an electrolyte sandwiched between a positive electrode and a negative electrode, a first storage vessel for storing a low-concentration fuel having a predetermined concentration, and a second storage vessel for containing a high-concentration fuel higher in concentration than the low-concentration fuel, with the fuels differing in concentration and stored in the first storage vessel and the second storage vessel being switchedly supplied according to the temperature of the power generation cell, the method including the steps of: supplying the fuels to the negative electrode while setting the quantity of the high-concentration fuel supplied to the negative electrode to be smaller than the quantity of the low-concentration fuel supplied to the negative electrode; and supplying an oxidizer to the positive electrode in a quantity set to be smaller than the quantity of the oxidizer supplied to the positive electrode in the case where the temperature of the power generation cell is at or above a predetermined temperature.

According to the method of starting a fuel cell in the present invention, in the fuel cell system the high-concentration fuel is supplied to the negative electrode side, whereby the high-concentration fuel can be brought into reaction with the oxidizer supplied to the positive electrode side, and the temperature of the power generation cell can be thereby raised. In this instance, heat generation can be accelerated by suppressing the quantities of the high-concentration fuel and the oxidizer supplied to the power generation cell to lower levels. This makes it possible to shorten the period of time taken to raise the temperature of the power generation cell in starting the fuel cell system. In addition, since the temperature of the power generation cell can be raised in a short time, the capacity of an auxiliary battery used when the temperature of the power generation cell is low can be reduced, whereby the fuel cell system can be reduced in size.

In the fuel cell system according to the present invention, the low-concentration fuel for performing mainly a power generation reaction and the high-concentration fuel for performing mainly the power generation reaction and a reaction for raising the temperature of the power generation cell are respectively stored in separate storage vessels, whereby the fuel supplied to the negative electrode can be instantaneously switched according to the temperature of the power generation cell. This makes it possible to perform an operation at a constantly optimum concentration. In addition, by supplying the high-concentration fuel from the negative electrode to the positive electrode through the electrolyte, the high-concentration fuel can be supplied dispersedly, whereby local heat generation can be prevented. Besides, it is possible to prevent the adhesion of water to the positive electrode which might be generated when the fuel is supplied directly to the positive electrode. Further, in the fuel cell system according to the present invention, the low-concentration fuel controlled to such a concentration as to enable an efficient power generation reaction is stored in the first storage vessel, it is possible, by supplying the power generation cell with the fuel only from the first storage vessel in normal operation, to supply the low-concentration fuel having a stable concentration, and thereby to perform stable power generation. In addition, since it is unnecessary to control the fuel concentration in the passage, there is no need for providing a fuel spray nozzle. Furthermore, by arranging the first storage vessel and the second storage vessel separately, the system can be designed according to frequencies of use of both storage vessels, and the fuels can be used without wasting. In addition, the concentrations of the fuels being stored can be regulated according to the environments of use. Besides, the first storage vessel and the second storage vessel are individually detachable, and they can be replaced.

According to the method of starting a fuel cell in the present invention, in the fuel cell system the high-concentration fuel is supplied to the negative electrode side, whereby the high-concentration fuel can be reacted with the oxidizer supplied to the positive electrode side, so as to raise the temperature of the power generation cell. In this instance, heat generation can be accelerated by suppressing the quantities of the high-concentration fuel and the oxidizer supplied to the power generation cell to low levels. This makes it possible to shorten the period of time taken to raise the temperature of the power generation cell in starting the fuel cell system. In addition, since the temperature of the power generation cell can be raised in a short time, the capacity of an auxiliary battery used when the temperature of the power generation cell is low can be reduced, and the fuel cell system can be reduced in size.

Additional features and advantages of the present invention are described in, and will be apparent from, the following Detailed Description and the Figures.

DETAILED DESCRIPTION

Figure 1:
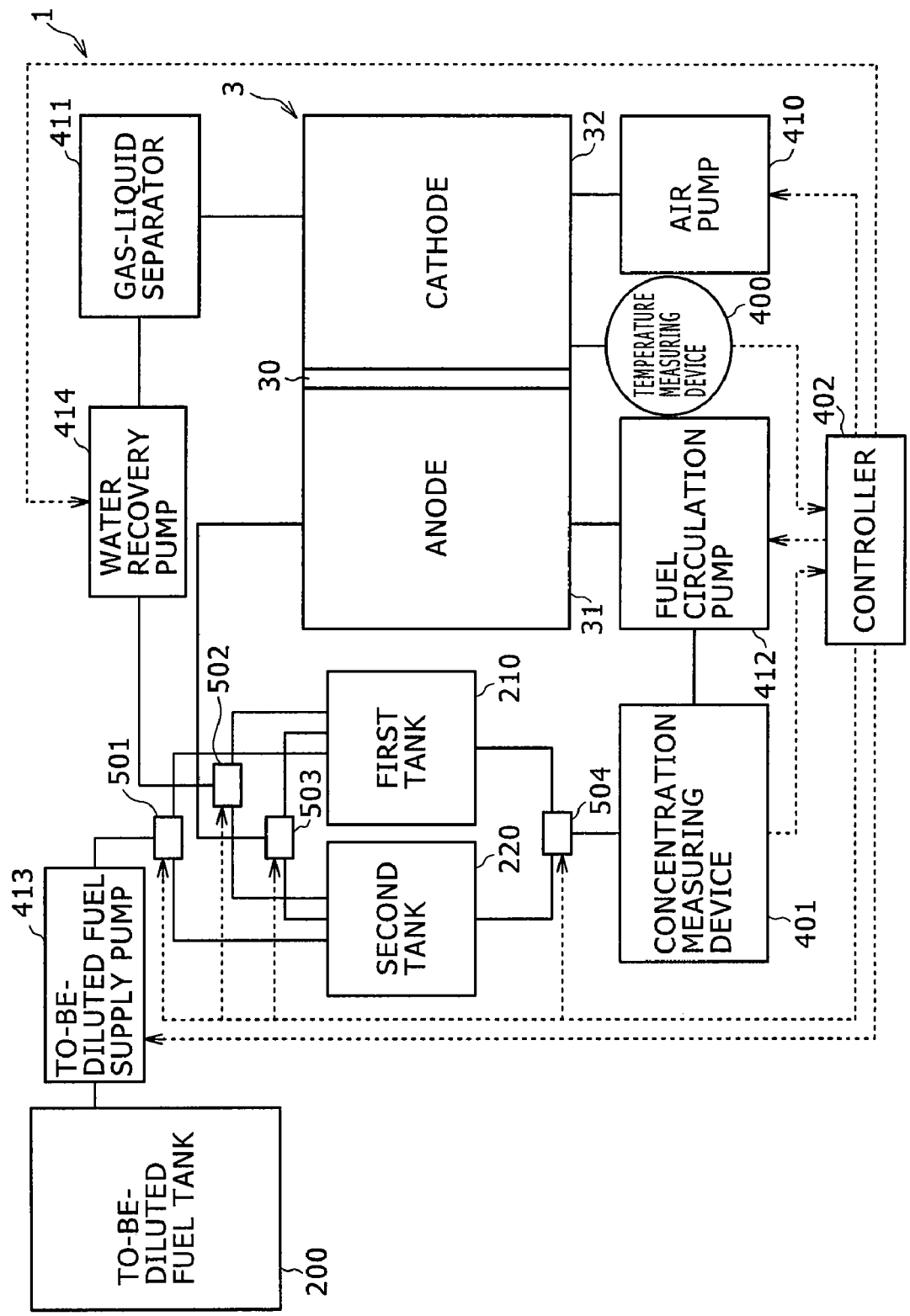
FIG. 1 is a block diagram showing an example of the configuration of a fuel cell system in the present invention.

Now, a fuel cell system and a fuel cell starting method in the fuel cell system according to the present invention will be described in detail below, referring to the drawings. Incidentally, the present invention is not limited to or by the following description, and various modifications can be made appropriately within the scope of the gist of the invention.

FIG. 1 is a block diagram showing an example of the configuration of the fuel cell system in the present invention. The fuel cell system 1 in the present invention includes a fuel cell 3 having an electrolyte film 30 sandwiched between a pair of electrodes composed of an anode 31 as a negative electrode and a cathode 32 as a positive electrode, a first tank 210 as a first storage vessel for storing a low-concentration aqueous methanol solution as a low-concentration fuel utilized mainly for a power generation reaction in a power generation cell 3, and a second tank 220 as a second storage vessel for storing a high-concentration aqueous methanol solution as a high-concentration fuel utilized mainly for a reaction for raising the temperature of the power generation cell 3. In addition, the fuel cell system 1 includes: an air pump 410 for supplying air as an oxidizer to the power generation cell 3; a gas-liquid separator 411 for separating into water and other substances generated by the power generation cell 3; a water recovery pump 414 for discharging separated water to the exterior of the power generation cell 3 and supplying it to the first tank 210 or the second tank 220; a fuel circulation pump 412 for circulating the low-concentration aqueous methanol solution and the high-concentration aqueous methanol solution; a temperature measuring device 400 for measuring the temperature of the power generation cell 3; a concentration measuring device 401 for measuring the concentrations of the low-concentration aqueous methanol solution and the high-concentration aqueous methanol solution; a to-be-diluted fuel tank 200 as a third storage vessel for storing methanol as a to-be-diluted fuel used as a raw material for the low-concentration aqueous methanol solution and the high-concentration aqueous methanol solution; a to-be-diluted fuel supply pump 413 for supplying methanol to the first tank 210 and the second tank 220; selector valves 501, 502, 503 and 504 for selecting (switching) the passages for methanol, the low-concentration aqueous methanol solution and the high-concentration aqueous methanol solution; and a controller 402 for reading measured values in the temperature measuring device 400 and the concentration measuring device 401 and sending commands to the valves and the like. Methanol and air used in the fuel cell system 1 are not limitative, and the fuel and the oxidizer can be modified as necessary, according to the power generation cell 3 mounted in the fuel cell system 1. In addition, the fuel cell system 1 may includes an auxiliary battery (not shown) for promoting the rise in the temperature of the power generation cell 3.

As shown in FIG. 1, the power generation cell 3 is a direct methanol type fuel cell in which the aqueous methanol solutions as fuels are supplied directly to the power generation cell 3. However, the fuel cell system in the present invention is not limited to this, and appropriate modifications are possible according to the power generation ability of the fuel cell.

The power generation cell 3 is composed of the film-formed electrolyte film 30 for permeation of protons and methanol therethrough, and the anode 31 and the cathode 32 having a catalyst in the power generation reaction, and is formed by sandwiching the electrolyte film 30 between the anode 31 and the cathode 32 and laminating them. The electrolyte film 30 for permeation of protons and methanol therethrough is formed from a material which has permeableness, oxidation resistance and thermal resistance. The anode 31 and the cathode 32 are each configured by use of a metallic material, a carbonaceous material, an electrically conductive nonwoven fabric or the like; where a carbonaceous material is used, for example, a catalyst such as platinum may be supported on the porous surfaces of the carbonaceous material. The sizes and shapes of the electrolyte film 30, the anode 31, and the cathode 32 can be modified as necessary according to the size and shape of the power generation cell 3. As shown in FIG. 1, the power generation cell 3 is a direct methanol type fuel cell in which the aqueous methanol solutions as fuels are supplied directly to the power generation cell 3; however, the fuel cell system in the present invention is not limited to this, and modifications can be made as necessary according to the power generation ability of the fuel cell. In the power generation cell 3, the power generation reaction and the reaction for raising the temperature of the power generation cell 3 can be effected by supplying the aqueous methanol solutions (described below) to the anode 31 and supplying air to the cathode 32.

In addition, the power generation cell 3 has the temperature measuring device 400 for measuring the temperature inside the power generation cell 3. Besides, the temperature measuring device 400 is connected to the controller 402 for reading the temperature inside the power generation cell 3 and giving commands to valves and the like. The temperature measuring device 400 used here is not particularly limited, and may be modified as necessary according to the power generation cell 3 mounted. For example, where a power generation cell 3 using a polymer electrolyte film is mounted in the fuel cell system 1, the temperature inside the power generation cell 3 is raised generally to 70 to 100° C., so that it suffices for the temperature measuring device 400 installed to be able to sufficiently measure the temperature even when the temperature exceeds this value. With the temperature of the power generation cell 3 measured by the temperature measuring device 400, the fuel supplied to the anode 31 can be switched through the controller 402 according to the temperature.

The to-be-diluted fuel tank 200 is a storage vessel for storing methanol as a to-be-diluted fuel, and is connected to the first tank 210 storing the low-concentration aqueous methanol solution therein and the second tank 220 storing the high-concentration aqueous methanol solution through the to-be-diluted fuel supply pump 413. In addition, since the selector valve 501 is provided at the branching point for branching to the first tank 210 and the second tank 220, methanol can be supplied to either one of the first tank 210 and the second tank 220. The selector valve 501 is connected to the controller 402 described below, and can be operated in conjunction with other valves or the like.

The to-be-diluted fuel supply pump 413 is provided between the to-be-diluted fuel tank 200 and the first tank 210 and the second tank 220, and can feed predetermined quantities of methanol from the to-be-diluted fuel tank 200 into the first tank 210 and the second tank 220. The to-be-diluted fuel pump 413 can be operated in conjunction with valves or the like, according to a command given from the controller 402 described below. In the case where the concentration of the low-concentration aqueous methanol solution or the high-concentration aqueous methanol solution is lower than a predetermined concentration, the to-be-diluted fuel supply pump 413 can supply methanol stored in the to-be-diluted fuel tank 200 to the first tank 210 or the second tank 220. This ensures that concentration control can be automatically conducted inside the fuel cell system 1 by supplying the to-be-diluted fuel tank 200 with methanol, without supplying the first tank 210 and the second tank 220 respectively with a low-concentration aqueous methanol solution and a high-concentration aqueous methanol solution which are separately prepared in the exterior of the fuel cell system 1.

The first tank 210 is a storage vessel for storing the low-concentration aqueous methanol solution. Similarly, the second tank 220 is a storage vessel for storing the high-concentration aqueous methanol solution. The first tank 210 and the second tank 220 are detachable, and the tanks can be replaced, as required. The first tank 210 and the second tank 220 are connected to the anode 31 of the power generation cell 3 by way of the selector valve 504, the concentration measuring device 401 and the fuel circulation pump 412 which will be described below. In addition, for circulating the aqueous methanol solutions, the anode 31 is connected to the first tank 210 and the second tank 220 through the selector valve 503. The selector valves 503 and 504 are connected to the controller 402 described below, and can be operated in conjunction with other valves or the like. Since the fuel cell system 1 has the first tank 210 and the second tank 220 mounted therein, the aqueous methanol solution to be used can be instantaneously switched over according to the temperature of the power generation cell 3. The shapes and sizes of the first tank 210 and the second tank 220 may be modified, as required, according to the frequencies of use of the tanks.

The concentration measuring device 401 is provided between the first tank 210 and the second tank 220 and the power generation cell 3, and can measure the concentrations of the low-concentration aqueous methanol solution supplied from the first tank 210 to the anode 31 of the power generation cell 3 and the high-concentration aqueous methanol solution supplied from the second tank 220 to the anode 31 of the power generation cell 3. Like the temperature measuring device 400 mentioned above, the concentration measuring device 401 is connected to the controller 402, and can be operated in conjunction with valves or the like. The concentration measuring device 401 measures the concentrations of the low-concentration aqueous methanol solution and the high-concentration aqueous methanol solution as above-mentioned, whereby the concentrations of the aqueous methanol solutions can be controlled by supplying methanol or water to the first tank 210 and the second tank 220 through the controller 402 according to the concentrations.

The fuel circulation pump 412 is provided between the first tank 210 and the second tank 220 and the power generation cell 3. The fuel circulation pump 412 is able to take out the low-concentration aqueous methanol solution from the first tank 210 and to supply the solution to the anode 31. In addition, the fuel circulation pump 412 is able to return to the first tank 210 the low-concentration aqueous methanol solution supplied to the anode 31. Further, the fuel circulation pump 412 is able to take out the high-concentration aqueous methanol solution from the second tank 220 and to supply the solution to the anode 31. In addition, the fuel circulation pump 412 is able to return to the second tank 220 the high-concentration aqueous methanol solution supplied to the anode 31. The fuel circulation pump 412 is connected to the controller 402, and can be operated in conjunction with valves or the like. Besides, the quantities of the aqueous methanol solutions circulated can also be controlled through the controller 402. This ensures that the temperatures of the aqueous methanol solutions can be brought close to the temperature of the fuel cell system 1, and that the heating efficiency of the reaction for raising the temperature of the power generation cell and the power generation efficiency of the power generation reaction can be enhanced. In addition, the use efficiency of methanol can also be raised.

The air pump 410 is connected to the cathode 32, and is capable of supplying air to the cathode 32. For example, in this embodiment, the air pump 410 is used as an air supplying means, but the air supplying means may be any means that is capable of supplying air to the cathode 32. For example, a fan or the like can also be used as the air supplying means. In addition, the air pump 410 is connected to the controller 402, and can be operated in conjunction with the fuel circulation pump 412 or the like. Besides, the quantity of air supplied to the cathode 32 can be controlled through the controller 402. This makes it possible to reduce the quantity of heat radiated, and to enhance the heating efficiency of the reaction for raising the temperature of the power generation cell 3 and the power generation efficiency of the power generation reaction. In addition, it is made possible to lower power consumption.

A gas-liquid separator 411 operates in cooperation with the water recovery pump 414, and is provided between the power generation cell 3 and the water recovery pump 414. Water produced inside the power generation cell 3 can be supplied to the gas-liquid separator 411, concurrently with exhaust by the air pump 410. The water thus supplied can be separated into water and other substances by the gas-liquid separator 411. For example, the gas-liquid separator 411 is capable of separation between water and other substances, of the water, air (oxygen and nitrogen), carbon dioxide and the like which are present in the power generation cell 3.

The water recovery pump 414 is provided between the gas-liquid separator 411 and the first tank 210 and the second tank 220, and is able to supply the water separated by the gas-air separator 411 to the first and second tanks 210, 220. The water recovery pump 414 is capable of supplying the water to the first tank 210 and the second tank 220 through the selector valve 502 according to an instruction from the controller 402.

Methanol as the to-be-diluted fuel is stored in the to-be-diluted fuel tank 200, and is supplied to the first tank 210 or the second tank 220 by the to-be-diluted fuel supply pump 413. The concentration in this instance is not particularly limited insofar as it is higher than the concentrations of the low-concentration aqueous methanol solution and the high-concentration aqueous methanol solution.

The low-concentration aqueous methanol solution as the low-concentration fuel is stored in the first tank 210. The low-concentration aqueous methanol solution is formed by mixing, in the first tank 210, of methanol supplied from the to-be-diluted fuel tank 200 and water supplied from the water recovery pump 414. The low-concentration aqueous methanol solution is supplied through the fuel circulation pump 412 into the power generation cell 3, and is able to perform the power generation reaction mainly. The concentration of the low-concentration aqueous methanol solution is in the range of about 1.5 to 6.5 wt %; however, the concentration is not particularly limited but can be appropriately modified to a concentration at which an efficient power generation reaction is possible in the power generation cell 3.

The high-concentration aqueous methanol solution as the high-concentration fuel is stored in the second tank 220. The high-concentration aqueous methanol solution is formed by mixing, in the second tank 220, of methanol supplied from the to-be-diluted fuel tank 200 and water supplied from the water recovery pump 414. The high-concentration aqueous methanol solution is supplied through the fuel circulation pump 412 into the power generation cell 3, and is able mainly to raise the temperature of the power generation cell 3. The concentration of the high-concentration aqueous methanol solution is in the range of about 20 to 30 wt %; however, the concentration is not particularly limited but can be appropriately modified to a concentration which is higher than the concentration of the low-concentration aqueous methanol solution and at which the reaction for raising the temperature of the power generation cell 3 can be efficiently achieved according to the use environments. With the low-concentration aqueous methanol solution and the high-concentration aqueous methanol solution formed by diluting methanol through using the water produced in the power generation cell 3, the need for preparing a vessel for storage of diluting water is eliminated, so that the fuel cell system 1 can be reduced in size. In addition, with the high-concentration aqueous methanol solution supplied from the anode 31 through the electrolyte film 30, the high-concentration aqueous methanol solution can be supplied in the state of being dispersed to the cathode 32 where the reaction for raising the temperature of the power generation cell 3 is effected.

The selector valve 501 is provided between the to-be-diluted fuel tank 200 and the first tank 210 and the second tank 220, whereby methanol in the to-be-diluted fuel tank 200 can be supplied to the first tank 210 or the second tank 220. The selector valve 502 is provided between the water recovery pump 414 and the first and second tanks 210, 220, whereby water can be supplied to the first tank 210 or the second tank 220 by the water recovery pump 414. The selector valve 503 is provided between the power generation cell 3 and the first tank 210 and the second tank 220. By the function of the selector valve 503, the low-concentration aqueous methanol solution can be supplied to the first tank 210, and the high-concentration aqueous methanol solution to the second tank 220. The selector valve 504 is provided between the first and second tanks 210, 220 and the power generation cell 3, whereby the low-concentration aqueous methanol solution or the high-concentration aqueous methanol solution can be supplied to the power generation cell 3. The selector valves 501, 502, 503 and 504 are not particularly limited, and their number, shapes, sizes and the like can be modified, as required, according to devices installed in the fuel cell system 1, etc.

The controller 402 is able to read numerical values in the temperature measuring device 400 and the concentration measuring device 401, and to control the air pump 410, the water recovery pump 414, the fuel circulation pump 412, the to-be-diluted fuel supply pump 413, and the selector valves 501, 502, 503 and 504. For example, the controller 402 is capable of controlling the fuel circulation pump 412 and the selector valves 502, 503 and 504 so as to supply the high-concentration aqueous methanol solution from the second tank 220 to the anode 31. In addition, the controller 402 is also capable of controlling the to-be-diluted fuel supply pump 413, the water recovery pump 414 and the selector valve 501 so as to supply methanol and water to the second tank 220.

In the fuel cell system 1 in the present invention, the low-concentration aqueous methanol solution for performing mainly the power generation reaction and the high-concentration aqueous methanol solution for performing mainly the power generation reaction and the reaction for raising the temperature of the power generation cell 3 are respectively stored in the separate tanks, whereby when the temperature of the power generation cell 3 is not higher than a predetermined temperature, the high-concentration aqueous methanol solution is supplied to the anode 31, and when the temperature of the power generation part 3 has exceeded the predetermined temperature, the aqueous methanol solution to be supplied to the anode 31 can be instantaneously changed over. This makes it possible to perform an operation at a constantly optimum concentration. In addition, with the high-concentration aqueous methanol solution supplied to the anode 31, the high-concentration aqueous methanol solution can be supplied dispersedly to the cathode 32 through the electrolyte film 30, and local heat generation can be prevented. Besides, the adhesion of water to the cathode 32 which would be generated when the aqueous methanol solution is supplied directly to the cathode 32 can be prevented. In addition, in the fuel cell system 1 in the present invention, the low-concentration aqueous methanol solution prepared to have such a concentration as to promise an efficient power generation reaction is stored in the first tank 210. Therefore, during normal operation, by supplying the power generation cell 3 with the fuel only from the first tank 210, it is possible to supply the low-concentration aqueous methanol solution having a stable concentration, and to perform stable power generation. Besides, since it is unnecessary to control the fuel concentration in the passage, there is no need for a fuel spray nozzle. Further, by providing the first tank 210 and the second tank 220 as separate bodies, they can be designed according to the frequencies of use thereof, and the fuels can be used without wasting. In addition, the concentrations of the fuels being stored can be adjusted according to the use environments. Besides, the first tank 210 and the second tank 220 are detachable, and the storage vessels can be replaced.

In the power generation cell 3 of the fuel cell system 1 in the present invention, when the temperature of the power generation cell 3 is not higher than the predetermined temperature, the high-concentration aqueous methanol solution is supplied to the power generation cell 3, whereby the reaction for raising the temperature of the power generation cell 3 can be effected. The reaction for raising the temperature inside the power generation cell 3 can be brought about by supplying the anode 31 with the high-concentration aqueous methanol solution from the second tank 220 and supplying the cathode 32 with air from the air pump 410. Methanol contained in the high-concentration aqueous methanol solution permeates through the electrolyte film 30, and oxidation of methanol takes place at the cathode 32. The oxidation is an exothermic reaction, so that heat is librated inside the power generation cell 3. Therefore, the temperature of the power generation cell 3 can be raised by the heat thus librated. In addition, by reducing the quantity of the high-concentration aqueous methanol solution supplied to the power generation cell 3 and the quantity of air supplied to the power generation cell 3 to below those during the power generation reaction, it is possible to use the high-concentration aqueous methanol solution for causing the reaction for raising the temperature of the power generation cell 3 to take place efficiently, and to raise the temperature of the power generation cell 3 efficiently. Since the high-concentration aqueous methanol solution is supplied from the anode 31 to the cathode 32 through the electrolyte film 30, the high-concentration fuel can be supplied in a dispersed manner, as compared with the case of supplying the high-concentration fuel directly to the cathode 32, and a local heat generating reaction can be prevented from taking place.

In addition, in the power generation cell 3 of the fuel cell system 1 in the present invention, when the temperature of the power generation cell 3 is above the predetermined temperature, the power generation reaction can be effected by supplying the low-concentration aqueous methanol solution to the power generation cell 3. The power generation reaction can be brought about by supplying the anode 31 with the low-concentration methanol solution from the first tank 210 and supplying the cathode 32 with air from the air pump 410. The low-concentration aqueous methanol solution supplied to the anode 31 is subjected to a reaction between water and methanol in the low-concentration aqueous methanol solution represented by the reaction formula: $CH_3OH + H_2O \rightarrow CO_2 + 6H^+ + 6e^-$. The proton ($H^+$) produced in this reaction migrates to the cathode 32 by permeating through the electrolyte film 30. On the other hand, the electron ($e^-$) produced in the reaction migrates from the anode 31 to the cathode 32 through an external circuit. The proton and the electron having thus migrated to the cathode 32 react there with oxygen in air supplied, the reaction being represented by the reaction formula: $3/2O_2 + 6H^+ + 6e^- \rightarrow 3H_2O$. Therefore, in the power generation cell 3 of the fuel cell system 1 in the present invention, the power generation reaction can be effected by supplying the low-concentration aqueous methanol solution and air.

Figure 2:
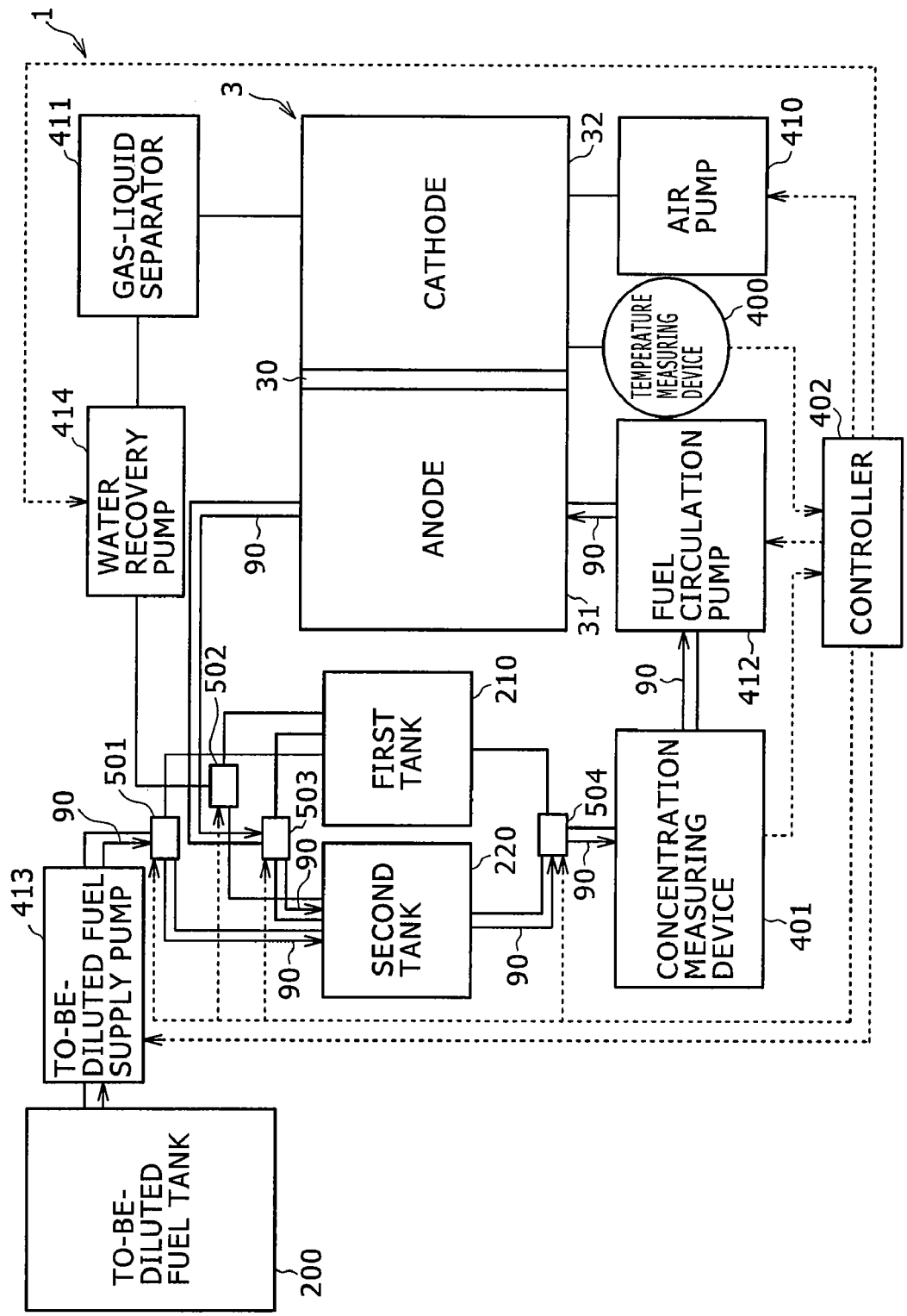
FIG. 2 shows the flows of methanol and a high-concentration aqueous methanol solution in starting of the fuel cell system in the present invention.

FIG. 2 shows the flows of methanol and the high-concentration aqueous methanol solution in starting the fuel cell system 1 in the present invention, in which arrows 90 indicate the flows of methanol and the high-concentration aqueous methanol solution. In starting the fuel cell system 1, as shown in FIG. 2, the high-concentration aqueous methanol solution is supplied from the second tank 220 to the anode 31 of the power generation cell 3 through the fuel circulation pump 412. Simultaneously, air is supplied to the cathode 32 of the power generation cell 3 through the air pump 410. This causes the reaction for raising the temperature of the power generation cell 3 to take place, whereby the temperature of the power generation cell 3 can be raised. In addition, the high-concentration aqueous methanol solution supplied to the anode 31 is returned to the second tank 220. Besides, water produced upon this reaction is separated by the gas-liquid separator 411, and is passed through the water recovery pump 414, to be utilized as diluting water for methanol. In this instance, the controller 402 functions so that the selector valve 503 shuts off the passage to the first tank 210, and that the selector valve 504 shuts off the passage from the first tank 210. Therefore, the low-concentration aqueous methanol solution stays in the first tank 210. In addition, the controller 402 performs such a control that the quantities of the high-concentration aqueous methanol solution and air supplied will be optimum for the reaction for raising the temperature of the power generation cell 3. The temperature of the power generation cell 3 is measured by the temperature measuring device 400, and the measured value is read by the controller 402. When the temperature measured by the temperature measuring device 400 has exceeded the predetermined temperature, the controller 402 is able to make an instantaneous switching from an operation of effecting the reaction for raising the temperature of the power generation cell to an operation of effecting the power generation reaction. The predetermined temperature means a temperature at which electric power can be generated comparatively efficiently in the power generation reaction in the power generation cell 3, and varies depending on the power generation cell 3 mounted in the system.

The high-concentration aqueous methanol solution used in the reaction for raising the temperature of the power generation cell 3 can be prepared by mixing, in the second tank 220, of methanol stored in the to-be-diluted fuel tank 200 and water recovered from the power generation cell 3. In this case, the controller 402 controls the to-be-diluted fuel supply pump 413 to operate. In addition, the controller 402 controls the selector valve 501 and the selector valve 502 to shut off the passages leading to the first tank 210. The concentration of the high-concentration aqueous methanol solution is constantly measured by the concentration measuring device 401, and the measured value is constantly transmitted to the controller 402. When the value measured by the concentration measuring device 401 does not show a predetermined concentration value, the controller 402 controls the to-be-diluted fuel supply pump 413 and the water recovery pump 414, whereby it is possible to effect an operation such that the high-concentration aqueous methanol solution will have the predetermined concentration.

The above-mentioned operations of the fuel cell system 1 are not limited to the time of starting the system. For example, the same operations as in starting may be set to be performed also when the temperature of the power generation cell 3 is lowered below a predetermined temperature during normal operation of performing the power generation reaction, such as when the outside air temperature is low. In this instance, the aqueous methanol solution supplied to the anode 31 can be switched from the low-concentration aqueous methanol solution to the high-concentration aqueous methanol solution by the controller 402 so as to effect the reaction for raising the temperature of the power generation cell 3.

Figure 3:
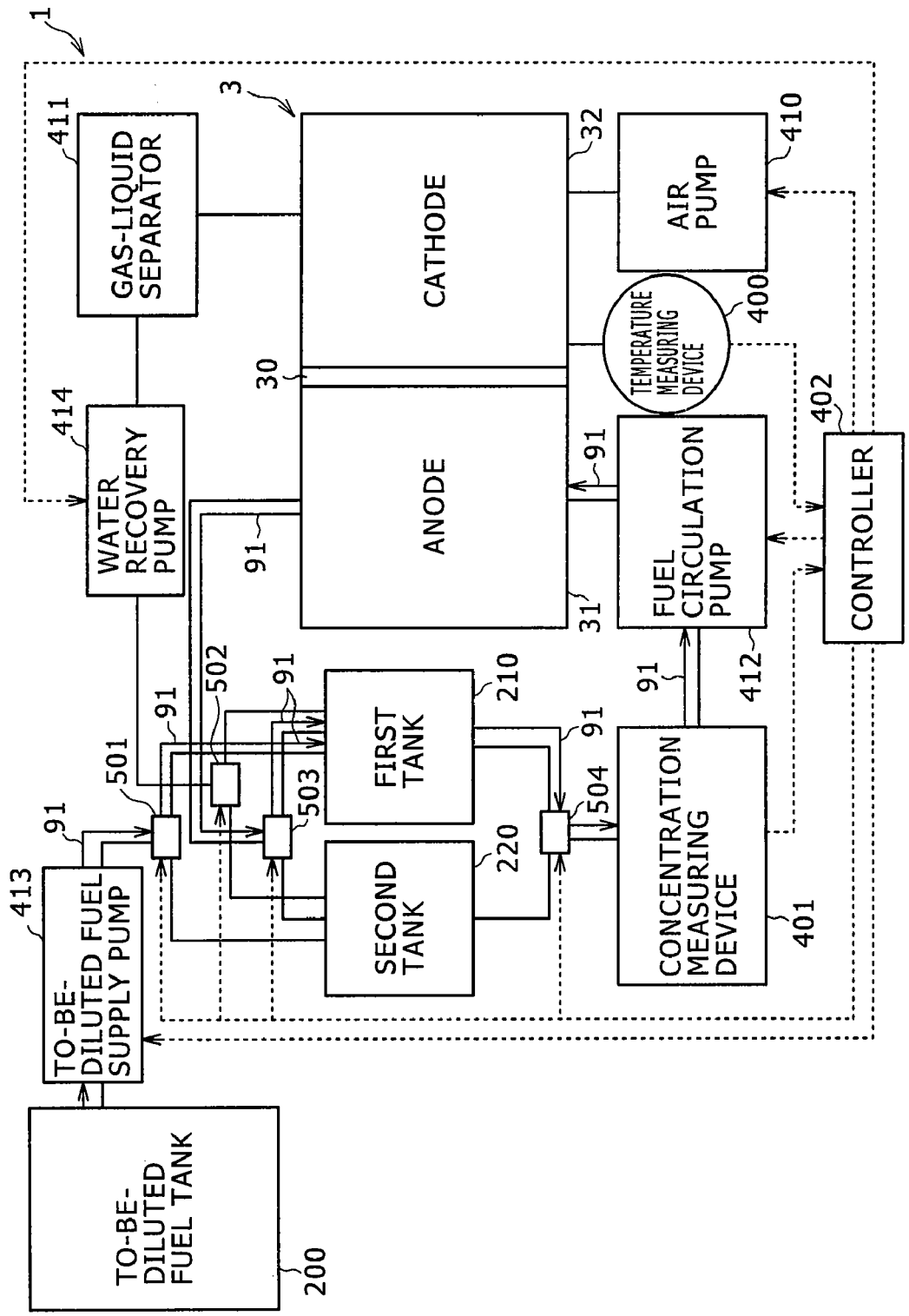
FIG. 3 shows the flows of methanol and a low-concentration aqueous methanol solution in normal operation of the fuel cell system in the present invention.

FIG. 3 shows the flows of methanol and the low-concentration aqueous methanol solution during normal operation of the fuel cell system 1 in the present invention, in which arrows 91 indicate the flows of methanol and the low-concentration aqueous methanol solution. During normal operation of the fuel cell system 1, i.e., when the temperature of the power generation cell 3 is above the predetermined temperature, the low-concentration aqueous methanol solution is supplied from the first tank 210 to the anode 31 of the power generation cell 3 through the fuel circulation pump 412, as shown in FIG. 3. At the same time, the air is supplied to the cathode 32 of the power generation cell 3 through the air pump 410. This causes the power generation reaction to take place. The low-concentration aqueous methanol solution supplied to the anode 31 is returned to the first tank 210. In addition, water produced upon this reaction is separated by the gas-liquid separator 411, and is passed through the water recovery pump 414, to be utilized as diluting water for methanol. In this instance, the controller 402 functions so that the selector valve 503 shuts off the passage leading to the second tank 220 and that the selector valve 504 shuts off the passage from the second tank 220. Therefore, the high-concentration aqueous methanol solution stays in the second tank 220. Besides, the controller 402 performs such a control that the quantities of the low-concentration aqueous methanol solution and air will be optimum for the power generation reaction.

The low-concentration aqueous methanol solution used in the power generation reaction can be supplemented by mixing, in the first tank 210, of methanol stored in the to-be-diluted fuel tank 200 and water recovered from the power generation cell 3. In this instance, the controller 402 controls the to-be-diluted fuel supply pump 413 to operate. In addition, the controller 402 controls the selector valve 501 and the selector valve 502 to shut up the passages leading to the second tank 220. In substantially the same manner as in the case of the high-concentration aqueous methanol solution, the concentration of the low-concentration aqueous methanol solution in this case is measured by the concentration measuring device 401, and is controlled by the controller 402 so as to be a predetermined concentration value.

As has been described above, in the fuel cell system 1 in the present invention, the low-concentration aqueous methanol solution for performing mainly the power generation reaction and the high-concentration aqueous methanol solution for performing mainly the power generation reaction and the reaction for raising the temperature of the power generation cell 3 are respectively stored in the separate storage vessels, whereby the aqueous methanol solution to be supplied to the anode 31 can be instantaneously changed over according to the temperature of the power generation cell 3. This makes it possible to perform an operation at a constantly optimum concentration. In addition, by supplying the high-concentration aqueous methanol solution from the anode 31 to the cathode 32 through the electrolyte film 30, the high-concentration aqueous methanol solution can be supplied in a dispersed manner, and local heat generation can be prevented. Besides, it is possible to prevent the adhesion of water to the cathode 32 which would be generated when the fuel is supplied directly to the cathode 32. In addition, in the fuel cell system in the present invention, the low-concentration fuel prepared to have a concentration permitting an efficient power generation reaction is stored in the first storage vessel. Therefore, by supplying the power generation cell with the fuel only from the first storage vessel during normal operation, it is possible to supply the low-concentration fuel having a stable concentration, and to perform stable power generation. Besides, since it is unnecessary to control the fuel concentration in the passage, there is no need for a fuel spray nozzle. Furthermore, by providing the first storage vessel and the second storage vessel as separate bodies, they can be designed according to the frequencies of use thereof, and the fuels can be used without wasting. In addition, the concentrations of the fuels being stored can be adjusted according to the use environments. Besides, the first storage vessel and the second storage vessels are individually detachable, and the storage vessels can be replaced.

Now, the method of starting the fuel cell in the fuel cell system 1 as above-described will be described below. As above-mentioned, the fuel cell system 1 is so configured that when the temperature of the power generation cell 3 is not higher than a predetermined temperature, such as at the time of starting the fuel cell system 1, the high-concentration aqueous methanol solution is supplied to the anode 31 and air is supplied to the cathode 32, whereby the reaction for raising the temperature of the power generation cell 3 can be brought about at the cathode 32 of the power generation cell 3. In this instance, the temperatures of the high-concentration aqueous methanol solution and air supplied to the power generation cell 3 are lower than the predetermined temperature at which to perform switching to the power generation reaction. Therefore, with the power generation cell 3 supplied with the high-concentration aqueous methanol solution and air, the power generation cell 3 liberate heat, which hamper a rise in the temperature of the power generation cell 3. The quantity of heat thus liberated depends on the quantities of the high-concentration aqueous methanol solution and air, so that the quantity of heat liberated can be suppressed to a low level by reducing the quantities of the high-concentration aqueous methanol solution and air supplied to the power generation cell 3. Specifically, by supplying the high-concentration aqueous methanol solution and air little by little, it is possible to supply them while making their temperatures approach the temperature of the power generation cell 3. Therefore, by reducing the quantities of the high-concentration aqueous methanol solution and air supplied to the power generation cell 3, it is possible to promote the rise in the temperature of the power generation cell 3. In addition, by a method in which the quantities of the high-concentration aqueous methanol solution and air supplied to the power generation cell 3 are suppressed below the quantities of the low-concentration aqueous methanol solution and air supplied to the power generation cell 3 at the time of performing the power generation reaction, the period of time taken to raise the temperature of the power generation cell 3 in starting the fuel cell system 1 can be shorted. The quantities of the high-concentration aqueous methanol solution and air supplied in this case are not particularly limited but are modified, as required, according to the temperature in the exterior of the fuel cell system 1, the size of the power generation cell 3, etc. Besides, by the fuel cell starting method in the present invention, it is possible to raise the temperature of the power generation cell 3 in a short time, and, it is possible to reduce the capacity of an auxiliary battery used when the temperature of the power generation cell 3 is low, and to reduce the fuel cell system 1 in size.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method of starting a fuel cell system which includes:
a power generation cell having an electrolyte sandwiched between a positive electrode and a negative electrode,
a first storage vessel for storing a low-concentration fuel having a predetermined concentration, and
a second storage vessel for containing a high-concentration fuel higher in concentration than said low-concentration fuel,
with said fuels differing in concentration and stored in said first storage vessel and said second storage vessel being switchedly supplied according to a temperature of said power generation cell, said method comprising the steps of:
supplying said fuels to said negative electrode while setting a first quantity of said high-concentration fuel supplied to said negative electrode to be smaller than a second quantity of said low-concentration fuel supplied to said negative electrode; and
supplying an oxidizer to said positive electrode in a third quantity set to be smaller than a fourth quantity of said oxidizer supplied to said positive electrode in the case where the temperature of said power generation cell is at or above a predetermined temperature.

2. A fuel cell system comprising:
a power generation cell having an electrolyte sandwiched between a positive electrode and a negative electrode,
a first storage vessel for storing a low-concentration fuel having a predetermined concentration, and
a second storage vessel for containing a high-concentration fuel higher in concentration than said low-concentration fuel,
with said fuels differing in concentration and stored in said first storage vessel and said second storage vessel being switchedly supplied according to a temperature of said power generation cell, wherein:
said fuels are supplied to said negative electrode and a first quantity of said high-concentration fuel supplied to said negative electrode is set to be smaller than a second quantity of said low concentration supplied to said negative electrode; and
an oxidizer is supplied to said positive electrode in a third quantity set to be smaller than a fourth quantity of said oxidizer supplied to said positive electrode in the case where the temperature of said power generation cell is at or above a predetermined temperature.

3. The fuel cell system as set forth in claim 2, wherein said low-concentration fuel is circulated between said first storage vessel and said power generation cell.

4. The fuel cell system as set forth in claim 2, wherein said high-concentration fuel is circulated between said second storage cell and said power generation cell.

5. The fuel cell system as set forth in claim 2, wherein said low-concentration fuel and said high-concentration fuel are each formed by diluting a to-be-diluted fuel with water produced in said power generation cell.

6. The fuel cell system as set forth in claim 5, wherein said to-be-diluted fuel is stored in a third storage vessel, and said to-be-diluted fuel is supplied from said third storage vessel to said first storage vessel and said second storage vessel.

7. The fuel cell system as set forth in claim 5, wherein said to-be-diluted fuel is methanol.

8. The fuel cell system as set forth in claim 2, wherein said high-concentration fuel is supplied to said negative electrode at the time of starting, and the fuel supplied to said negative electrode is switched to said low-concentration fuel at the time of normal operation.

* * * * *